(12) United States Patent
Rakowski et al.

(10) Patent No.: US 12,572,048 B2
(45) Date of Patent: Mar. 10, 2026

(54) BROADBAND OPTICAL SWITCHES BASED ON A RING-ASSISTED MACH-ZHENDER INTERFEROMETER

(71) Applicant: GlobalFoundries U.S. Inc., Malta, NY (US)

(72) Inventors: Michal Rakowski, Ballston Lake, NY (US); Sujith Chandran, Clifton Park, NY (US); Takako Hirokawa, Ballston Lake, NY (US); Pilar Gonzalez, Halfmoon, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 248 days.

(21) Appl. No.: 18/210,151

(22) Filed: Jun. 15, 2023

(65) Prior Publication Data

US 2024/0419047 A1     Dec. 19, 2024

(51) Int. Cl.
*G02F 1/225* (2006.01)
*G02F 1/01* (2006.01)
*G02F 1/21* (2006.01)

(52) U.S. Cl.
CPC ............ *G02F 1/225* (2013.01); *G02F 1/0147* (2013.01); *G02F 1/212* (2021.01)

(58) Field of Classification Search
None
See application file for complete search history.

(56) References Cited

U.S. PATENT DOCUMENTS

| | | | |
|---|---|---|---|
| 6,510,259 | B1 | 1/2003 | Al-hemyari |
| 7,424,181 | B2 | 9/2008 | Haus et al. |

| | | | | |
|---|---|---|---|---|
| 10,649,305 | B2 | 5/2020 | Anderson et al. | |
| 11,029,465 | B1 | 6/2021 | Rakowski et al. | |
| 11,209,677 | B1 * | 12/2021 | Roxworthy | ............. G01S 17/89 |
| 2006/0222296 | A1 | 10/2006 | Suzuki et al. | |
| 2015/0049338 | A1 * | 2/2015 | Wang | ........................ G02B 6/10 |
| | | | | 356/450 |

(Continued)

FOREIGN PATENT DOCUMENTS

| | | | | |
|---|---|---|---|---|
| CN | 114153085 | A * | 3/2022 | ........... G02F 1/0305 |
| JP | 2009282460 | A | 12/2009 | |

(Continued)

OTHER PUBLICATIONS

Translation of CN114153085A (Year: 2022).*

(Continued)

*Primary Examiner* — Chad H Smith

(74) *Attorney, Agent, or Firm* — Thompson Hine LLP; Anthony Canale

(57) ABSTRACT

Structures for a broadband optical switch and methods of forming such structures. The structure comprises a Mach-Zehnder interferometer including first and second arms. The first arm comprises a first waveguide core, and the second arm comprises a second waveguide core. The structure further comprises a ring resonator comprising a third waveguide core that has a first thickness. A portion of the third waveguide core is adjacent to a portion of the first waveguide core over a light coupling region. A slab layer connects the portion of the first waveguide core to the portion of the third waveguide core. The slab layer has a second thickness that is less than the first thickness of the first waveguide core.

17 Claims, 5 Drawing Sheets

(56) References Cited

U.S. PATENT DOCUMENTS

2023/0168431 A1* 6/2023 Norman .................. G02F 1/015
385/24

FOREIGN PATENT DOCUMENTS

| TW | 452643 B | 9/2001 |
| WO | 2009048572 A1 | 4/2009 |
| WO | 2015021577 A1 | 2/2015 |

OTHER PUBLICATIONS

Taiwan Intellectual Property Office; Examination Report issued in Taiwanese Patent Application No. 113117955 on Mar. 25, 2025; 20 pages.
European Patent Office, Extended European Search Report and Opinion issued in European Patent Application No. 23215720.6 on Jun. 18, 2024; 10 pages.
T. Hirokawa et al., "A Wavelength-Selective Multiwavelength Ring-Assisted Mach-Zehnder Interferometer Switch," in Journal of Lightwave Technology, vol. 38, No. 22, pp. 6292-6298, Nov. 15, 15, 2020, doi: 10.1109/JLT.2020.3011944.

L. Lu et al., "4×4 Silicon Optical Switches Based on Double-Ring-Assisted Mach-Zehnder Interferometers," in IEEE Photonics Technology Letters, vol. 27, No. 23, pp. 2457-2460, 1 Dec. 1, 2015, doi: 10.1109/LPT.2015.2470133.
M. A. Tran, C. Zhang and J. E. Bowers, "A broadband optical switch based on adiabatic couplers," 2016 IEEE Photonics Conference (IPC), Waikoloa, HI, USA, 2016, pp. 755-756, doi: 10.1109/IPCon.2016.7831302.
Piero Orlandi, Francesco Morichetti, Michael John Strain, Marc Sorel, Andrea Melloni, and Paolo Bassi, "Tunable silicon photonics directional coupler driven by a transverse temperature gradient," Optics Letter 38, 863-865 (2013).
Liangjun Lu, Linjie Zhou, Xinwan Li, and Jianping Chen, "Low-power 2×2 silicon electro-optic switches based on double-ring assisted Mach-Zehnder interferometers," Optics Letter 39, 1633-1636 (2014).
Taiwan Intellectual Property Office; Allowance Decision issued in Taiwanese Patent Application No. 113117955 on Jun. 30, 2025; 3 pages.
Korean Intellectual Property Office; Notice of Preliminary Rejection issued in Korean Patent Application No. 10-2024-0065716 on Sep. 12, 2025; 10 pages.

* cited by examiner

BROADBAND OPTICAL SWITCHES BASED ON A RING-ASSISTED MACH-ZHENDER INTERFEROMETER

BACKGROUND

The disclosure relates to photonics chips and, more specifically, to structures for a broadband optical switch and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as a laser or an optical fiber.

An optical switch is a common photonic component that may be found in a photonic integrated circuit. A Mach-Zehnder interferometer can be used as a base device for an optical switch. An optical coupler splits input light between a pair of arms of the Mach-Zehnder interferometer. A phase difference may be introduced between the light propagating in the different arms to provide a pair of different switched conditions. The arms converge at a downstream optical coupler at which the light is combined. In one switched condition, the phase difference between the light after propagating through the arms is an odd multiple of pi, and the combined light exits from an output port of the output coupler. In the other switched condition, the phase difference between the light after propagating through the arms is an even multiple of pi, and the combined light exits from a different output port of the output coupler.

Conventional optical switches based on a Mach-Zehnder interferometer may be characterized by an overly narrow bandwidth that is unacceptable in certain applications or systems. Conventional optical switches based on a Mach-Zehnder interferometer may also suffer from excessive crosstalk.

Improved structures for a broadband optical switch and methods of forming such structures are needed.

SUMMARY

In an embodiment of the invention, a structure for an optical switch is provided. The structure comprises a Mach-Zehnder interferometer including a first arm and a second arm. The first arm comprises a first waveguide core, and the second arm comprises a second waveguide core. The structure further comprises a ring resonator comprising a third waveguide core that has a first thickness. The third waveguide core includes a portion that is adjacent to a portion of the first waveguide core over a light coupling region. The structure further comprises a slab layer that connects the portion of the first waveguide core to the portion of the third waveguide core. The slab layer has a second thickness that is less than the first thickness.

In an embodiment of the invention, a structure for an optical switch is provided. The structure comprises a ring resonator including a first waveguide core that has a sidewall, and a Mach-Zehnder interferometer including a first arm and a second arm. The first arm comprises a second waveguide core, the second arm comprises a third waveguide core, and the second waveguide core overlaps with a portion of the first waveguide core over a light coupling region.

In an embodiment of the invention, a method of forming a structure for an optical switch is provided. The method comprises forming a Mach-Zehnder interferometer that includes a first arm and a second arm. The first arm comprises a first waveguide core, and the second arm comprises a second waveguide core. The method further comprises forming a ring resonator that comprises a third waveguide core. The third waveguide core has a first thickness, and the third waveguide core includes a portion that is adjacent to a portion of the first waveguide core over a light coupling region. The method further comprises forming a slab layer that connects the portion of the first waveguide core to the portion of the third waveguide core. The slab layer has a second thickness that is less than the first thickness.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figures 1, 2:
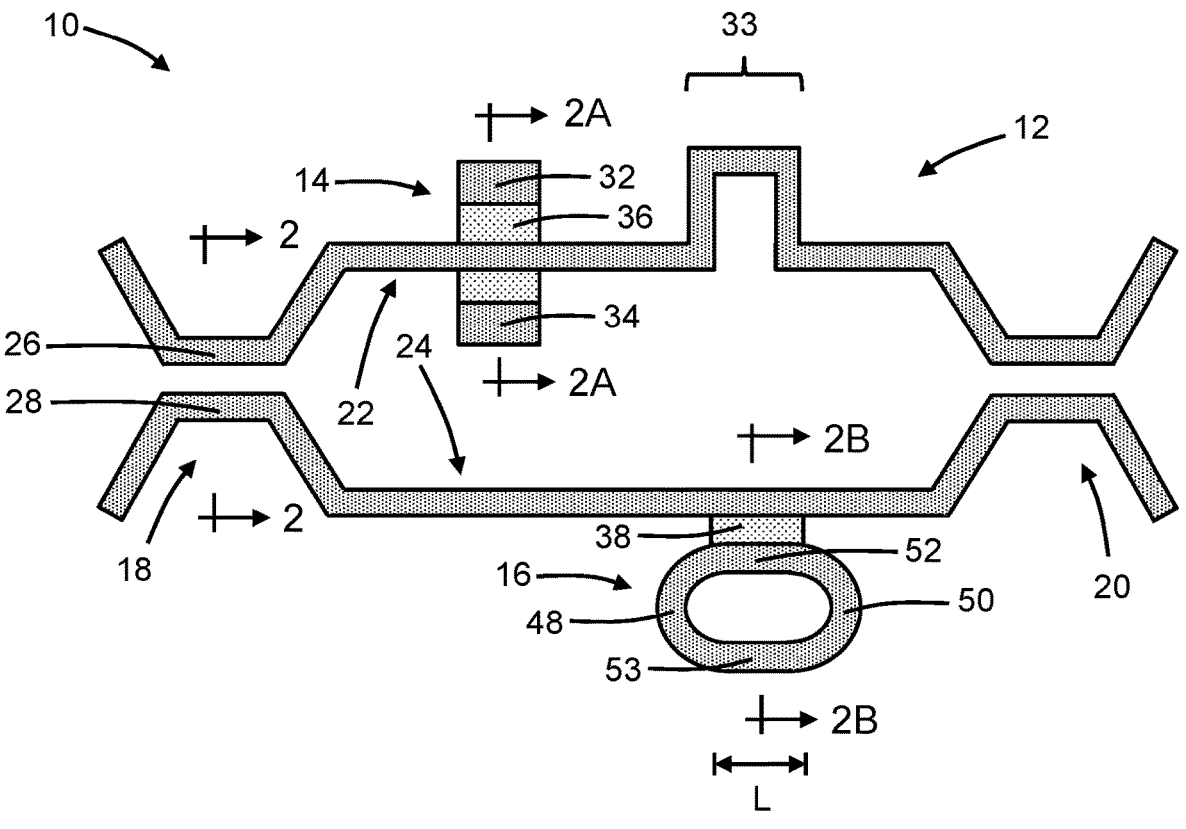
FIG. 1 is a top view of a structure for an optical switch in accordance with embodiments of the invention.
FIG. 2 is a cross-sectional view of the structure taken generally along line 2-2 in FIG. 1.
Figure 2A:
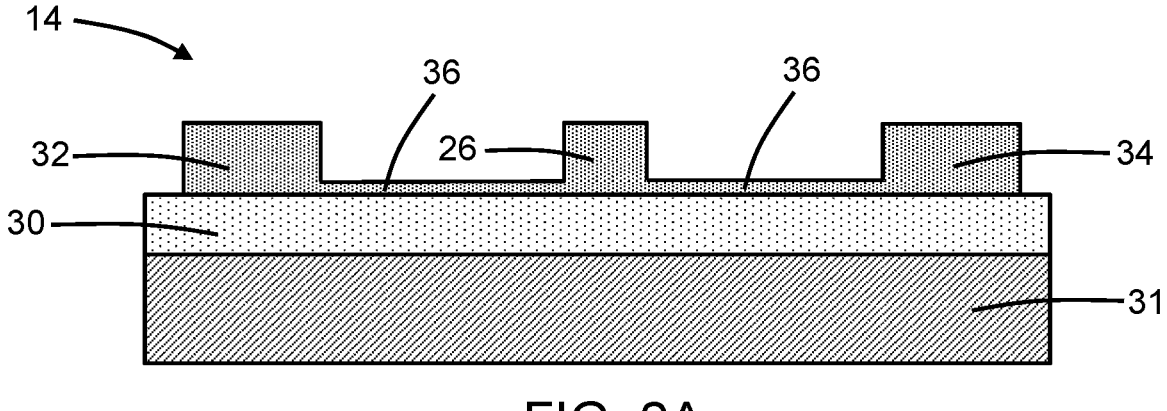
FIG. 2A is a cross-sectional view of the structure taken generally along line 2A-2A in FIG. 1.
Figure 2B:
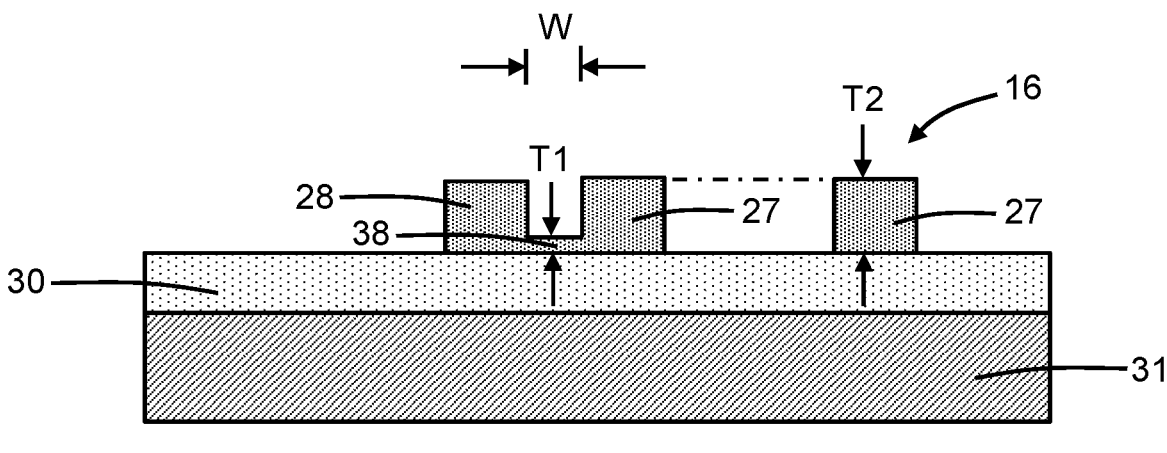
FIG. 2B is a cross-sectional view of the structure taken generally along line 2B-2B in FIG. 1.

With reference to FIGS. 1, 2, 2A, 2B and in accordance with embodiments of the invention, a structure 10 for a broadband optical switch includes a Mach-Zehnder interferometer 12, a thermo-optic phase shifter 14 embedded in the Mach-Zehnder interferometer 12, and a ring resonator 16 embedded in the Mach-Zehnder interferometer 12. The Mach-Zehnder interferometer 12 includes an input optical coupler 18, an output optical coupler 20, and arms 22, 24 that are separately routed from the input optical coupler 18 to the output optical coupler 20. Waveguide cores 26, 28 may include portions that provide the input optical coupler 18 and the output optical coupler 20. The waveguide cores 26, 28 that also include portions that provide the arms 22, 24 connecting the input optical coupler 18 to the output optical coupler 20. The ring resonator 16 may also include a waveguide core 27 that has a closed geometrical shape.

The waveguide cores 26, 27, 28 may be disposed on, and over, a dielectric layer 30 and a semiconductor substrate 31 of a photonics chip. In an embodiment, the dielectric layer 30 may be comprised of a dielectric material, such as silicon dioxide, and the semiconductor substrate 31 may be comprised of a semiconductor material, such as single-crystal silicon. In an embodiment, the dielectric layer 30 may be a buried oxide layer of a silicon-on-insulator substrate.

The input optical coupler 18 may receive light from either the waveguide core 26 or the waveguide core 28 as input to the Mach-Zehnder interferometer 12. In an embodiment, the input optical coupler 18 may be a directional coupler in which adjacent portions of the waveguide core 26 and the waveguide core 28 are routed with a proximity characterized by a spacing that supports light transfer. In an embodiment, the input optical coupler 18 may be a 50-50 directional coupler that splits the light evenly between the arms 22, 24. In an embodiment, the output optical coupler 20 may be a directional coupler in which adjacent portions of the waveguide core 26 and the waveguide core 28 are routed with a proximity characterized by a spacing that supports light transfer. In an embodiment, the output optical coupler 20 may be a 50-50 directional coupler.

The arm 22 of the Mach-Zehnder interferometer 12 may include a phase delay section 33 that is integrated into the waveguide core 26. The phase delay section 33 introduces an optical path length difference representing an unbalanced length between the arm 22 and the arm 24. The unbalanced length introduces a time differential between the light propagating in the arm 22 of the waveguide core 26 and the light propagating in the arm 24 of the waveguide core 28.

The thermo-optic phase shifter 14 is associated with a portion of the waveguide core 26 in the arm 22 of the Mach-Zehnder interferometer 12. The thermo-optic phase shifter 14 may include a resistive heating element 32, a resistive heating element 34, and a slab layer 36 that connects the resistive heating elements 32, 34 to the portion of the waveguide core 26. The resistive heating elements 32, 34 are positioned adjacent to the portion of the waveguide core 26, which is laterally disposed between the resistive heating element 32 and the resistive heating element 34. The slab layer 36 has a thickness that is less than the thickness of the waveguide core 26 and the resistive heating elements 32, 34.

The resistive heating elements 32, 34 are configured to generate heat by Joule heating under the control of a variable electrical signal, and the generated heat is transferred by conduction from the resistive heating elements 32, 34 to the portion of the waveguide core 26. The slab layer 36 provides a portion of the thermal path for conduction of the heat to the portion of the waveguide core 26. The temperature of the portion of the waveguide core 26 is locally elevated by the transferred heat. The localized temperature change experienced by the portion of the waveguide core 26 is effective to change the refractive index of its constituent material through the thermo-optic effect and to thereby alter the phase of light propagating in the portion of the waveguide core 26. The selectively altered phase of the light provides the switching action for the optical switch at the output optical coupler 20.

The waveguide core 27 of the ring resonator 16 includes a portion that is disposed adjacent to a portion of the waveguide core 28 in the arm 24 of the Mach-Zehnder interferometer 12. The portion of the waveguide core 27 of the ring resonator 16 is separated from the adjacent portion of the waveguide core 28 of the arm 24 by a notch or gap. In an embodiment, the adjacent portions of the waveguide core 27 and the waveguide core 28 across the gap define a light coupling region that is characterized by a coupling length L. In an embodiment, the light coupling region may be the physical length over which the portions of the waveguide cores 27, 28 are adjacent and juxtaposed.

In an embodiment, the ring resonator 16 may be configured with an oblong or racetrack shape. In an embodiment, the waveguide core 27 of the ring resonator 16 may include a curved end 48, a curved end 50, and side sections 52, 53 that connect the curved ends 48, 50 to provide the racetrack shape. In an embodiment, the waveguide core 27 of the ring resonator 16 may be elongated with the side sections 52, 53 having a length that is greater than their separation. In an embodiment, the side section 52 may be straight or linear such that the gap between the waveguide cores 27, 28 is constant over the coupling region. In an embodiment, the light coupling region may extend from the juncture between the curved end 48 and side section 52 to the juncture between the curved end 50 and side section 52. The length of the side section 52 may be varied, among other variables, in order to vary the coupling length L of the coupling region.

A slab layer 38 may connect the portion of the waveguide core 27 on one side of the gap to the portion of the waveguide core 28 on the opposite side of the gap. The slab layer 38 extends laterally as a strip on the dielectric layer 30 that spans or bridges the gap between the adjacent portions of the waveguide cores 27, 28 on the opposite sides of the gap. In an embodiment, the slab layer 38 may be connected to the side section 52 of the ring resonator 16 over the entire coupling region. The slab layer 38 has a thickness T1 that is less than the thickness T2 of either the waveguide core 27 or the waveguide core 28. The thinner slab layer 38 may be connected to a lower region of the waveguide core 27 in the coupling region and a lower region of the waveguide core 28 over the extent of the coupling region. In an embodiment, the waveguide cores 27, 28 may have equal thicknesses T2. The waveguide cores 27, 28 include upper regions that project above the slab layer 38 by a height equal to the difference between the thicknesses T1, T2.

The coupling length L of the light coupling region may be selected to enhance the coupling strength between the adjacent portions of waveguide cores 27, 28. In an embodiment, the slab layer 38 may extend over the entirety of the coupling length L such that the gap separating the adjacent portions of waveguide cores 27, 28 and the slab layer 38 are coextensive. The coupling width W between the adjacent portions of waveguide cores 27, 28, which is the width of the gap bridged by the slab layer 38, may also be selected to enhance the coupling strength.

In an embodiment, the optical path length difference introduced by the phase delay section 33 and the circumference of the ring resonator 16 may have a fixed ratio selected to contribute to configuring the structure 10 as a broadband switch. In an embodiment in which the waveguide core 26 and the waveguide core 27 are comprised of the same material and have the same refractive index, the ratio of the circumference to the optical path length difference may be equal or substantially equal to 1.5 in order to optimize the performance of the structure 10 as a broadband switch. The fixed ratio will include an additional multiplicative factor if the waveguide core 26 and the waveguide core 27 are comprised of different materials that have different refractive indices. In an embodiment, the free spectral range of the ring resonator 16 and/or the optical path length difference introduced by phase delay section 33 may be selected to determine the bandwidth of the broadband optical switch. In an embodiment, the coupling strength between the ring resonator 16 and the adjacent portion of the waveguide core 28 may be selected to be greater than or equal to 70 by selecting variables such as the coupling length L.

In an embodiment, the waveguide cores 26, 27, 28, the resistive heating elements 32, 34, and slab layers 36, 38, may be comprised of a semiconductor material, such as single-crystal silicon, that is formed by patterning with multiple lithography and etching processes that enable the formation of the slab layer 36. In an embodiment, the resistive heating element 32 and resistive heating element 34 may be doped with either a p-type dopant or an n-type dopant and/or may include a silicide layer. In an alternative embodiment, the waveguide cores 26, 28 may be comprised of a dielectric material, such as silicon nitride, silicon oxynitride, or aluminum nitride, in combination with the thermo-optic phase shifter 14 and the waveguide core 27 of the ring resonator 16 being comprised of a semiconductor material, such as single-crystal silicon. In an alternative embodiment, the phase delay section 33 in the arm 22 may also be comprised of the semiconductor material.

Figure 3:
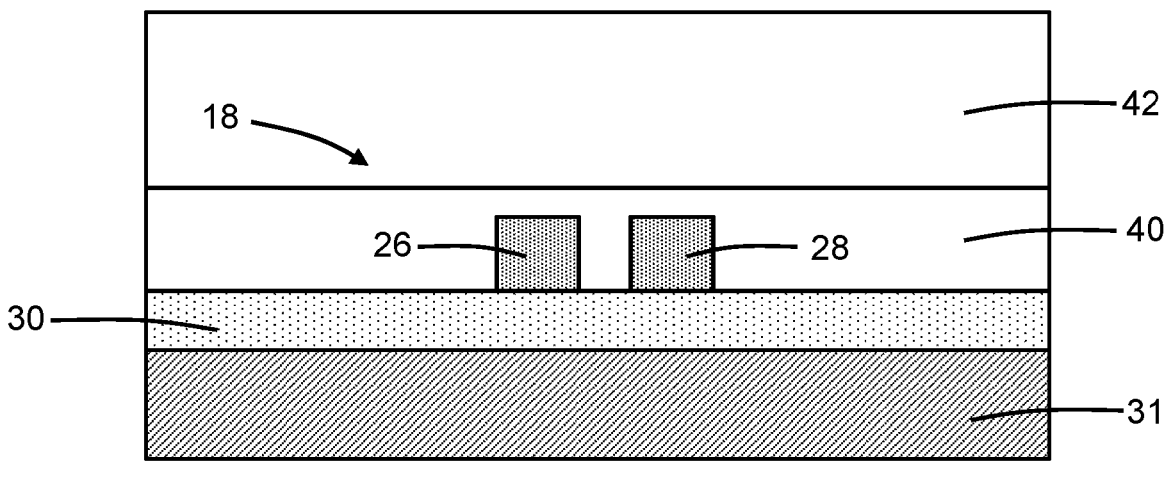
FIGS. 3, 3A, 3B are cross-sectional views of the structure at a fabrication stage of the processing method subsequent to FIGS. 2, 2A, 2B.
Figure 3A:
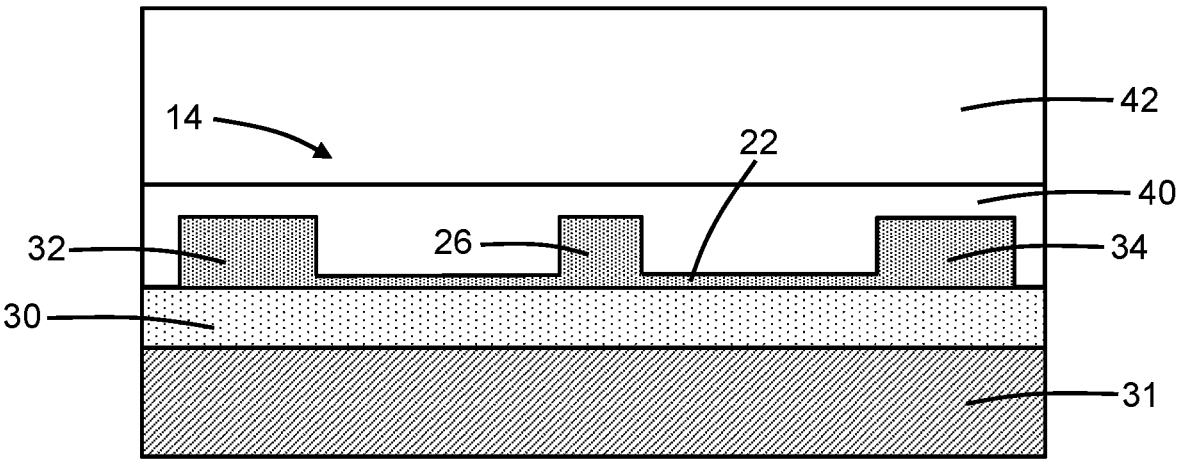
Figure 3B:
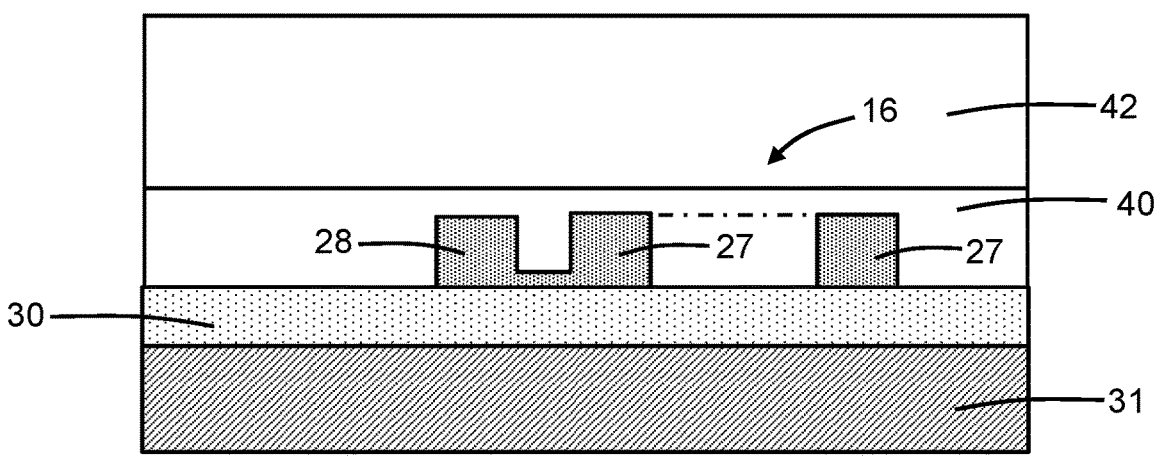

With reference to FIGS. 3, 3A, 3B and at a fabrication stage subsequent to FIGS. 1, 2, 2A, 2B, a dielectric layer 40 may be formed over the Mach-Zehnder interferometer 12, the thermo-optic phase shifter 14, and the ring resonator 16. The dielectric layer 40 may be comprised of a dielectric material, such as silicon dioxide, that is deposited and then planarized following deposition. A back-end-of-line stack 42 may be formed over the dielectric layer 40. The back-end-of-line stack 42 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide.

In use, the optical switch embodied in the structure 10 may be used to switch the output from the output optical coupler 20 to be routed to either the downstream portion of the waveguide core 26 or the downstream portion of the waveguide core 28. Light arriving at the input optical coupler 18 in the waveguide core 26 is split by the input optical coupler 18 between the arm 22 and the arm 24. Light propagating in the arm 22 may be subject to a phase delay that is variable under the control of the thermo-optic phase shifter 14. The output optical coupler 20 combines the light arriving in the arms 22, 24 to provide either constructive or destructive interference according to the value of the phase delay. Light exiting the output optical coupler 20 may be output to the downstream portion of the waveguide core 26 if the phase delay is zero and may be output to the waveguide core 28 if the phase delay is equal to pi (i.e., one-half of a wavelength). Similarly, light arriving at the input optical coupler 18 in the waveguide core 28 is split by the input optical coupler 18 between the arm 22 and the arm 24. Light propagating in the arm 22 may be subject to a phase delay that is variable under the control of the thermo-optic phase shifter 14. The output optical coupler 20 combines the light arriving in the arms 22, 24 to provide either constructive or destructive interference according to the value of the phase delay. Light exiting the output optical coupler 20 may be output to the downstream portion of the waveguide core 28 if the phase delay is zero or output to the downstream portion of the waveguide core 26 if the phase delay is equal to pi.

The optical switch may be characterized by a tunable center wavelength. The slab layer 38 connecting the waveguide core 27 of the ring resonator 16 to the waveguide core 28 in the arm 24 of the Mach-Zehnder interferometer 12 may permit the coupling length L to be shortened while providing a coupling power that is greater than 70. The enhanced coupling power of the optical coupling between the waveguide core 27 of the ring resonator 16 and the waveguide core 28 in the arm 24 of the Mach-Zehnder interferometer 12 may provide the optical switch with a reduced crosstalk.

Figure 4:
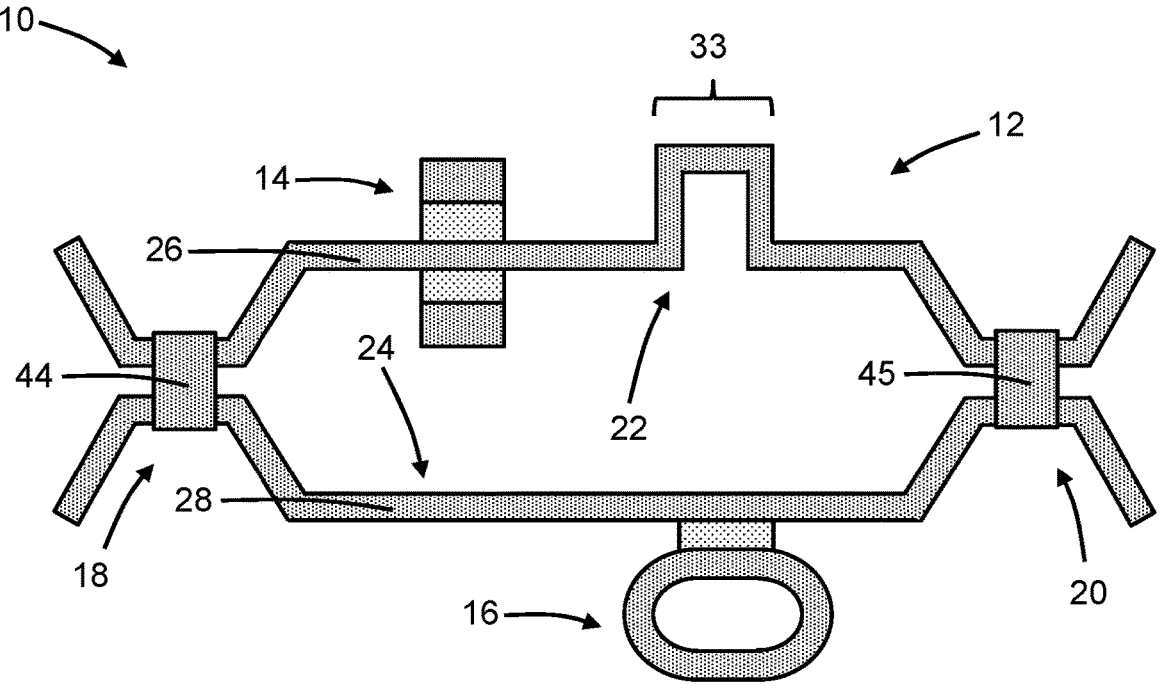
FIG. 4 is a top view of a structure for an optical switch in accordance with alternative embodiments of the invention.

With reference to FIG. 4 and in accordance with alternative embodiments of the invention, the input optical coupler 18 and/or output optical coupler 20 may be configured as multi-mode interference couplers. In an embodiment, the input optical coupler 18 may include a multi-mode interference region 44 that is configured to split light arriving from either the waveguide core 26 or the waveguide core 28 between the arms 22, 24. In an embodiment, the output optical coupler 20 may include a multi-mode interference region 45 that is configured to combine light received from the arms 22, 24. In the representative embodiment, the multi-mode interference region 44 of the input optical coupler 18 may have a pair of input ports respectively coupled to upstream portions of the waveguide cores 26, 28 and a pair of output ports coupled to arms 22, 24. In an alternative embodiment, the multi-mode interference region 44 of the input optical coupler 18 may have a single input port coupled to the upstream portion of, for example, the waveguide core 26 and a pair of output ports coupled to arms 22, 24. In the representative embodiment, the multi-mode interference region 45 of the output optical coupler 20 may have a pair of input ports coupled to the arms 22, 24 and a pair of output ports coupled to downstream portions of the waveguide cores 26, 28.

Figures 5, 6:
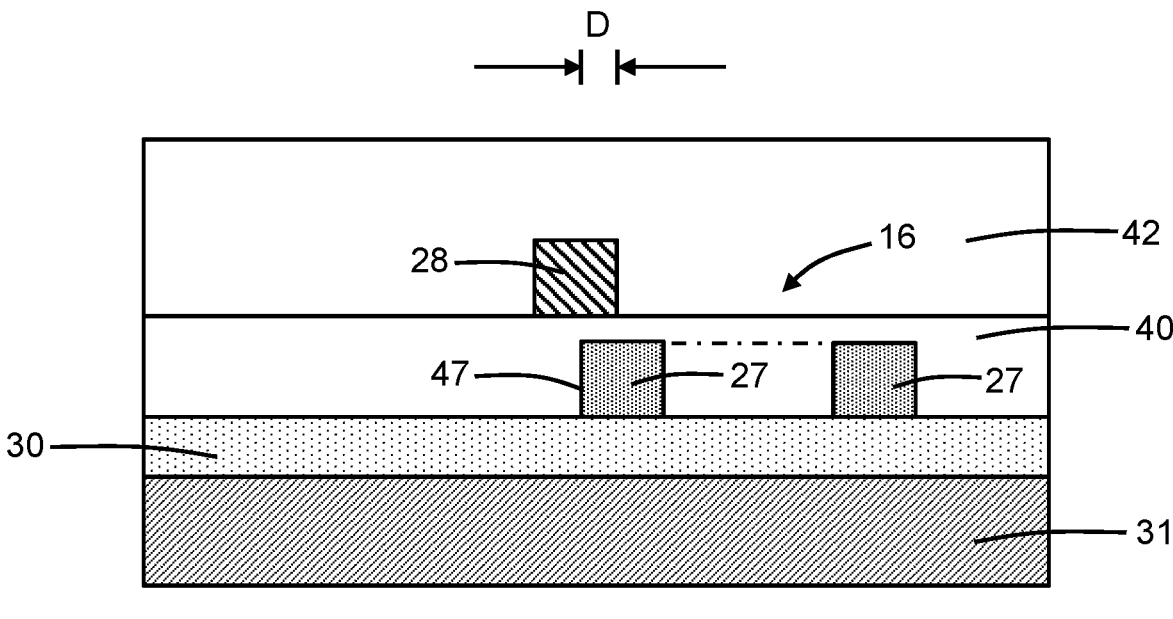
FIG. 5 is a cross-sectional view of a structure for an optical switch in accordance with alternative embodiments of the invention.
FIG. 6 is a cross-sectional view of a structure for an optical switch in accordance with alternative embodiments of the invention.

With reference to FIG. 5 and in accordance with alternative embodiments of the invention, the waveguide core 28 may be disposed on the dielectric layer 40 such that the waveguide core 28 is located at a higher elevation relative to the semiconductor substrate 31 than the waveguide core 27 of the ring resonator 16. A portion of the dielectric layer 40 is disposed between the waveguide core 27 and the waveguide core 28 such that the waveguide cores 27, 28 are non-contacting due to the intervening dielectric material.

In an embodiment, the waveguide core 28 may be comprised of a material having a refractive index that is greater than the refractive index of silicon dioxide. In an embodiment, the waveguide core 28 may be comprised of a dielectric material, such as silicon nitride, silicon oxynitride, or aluminum nitride. In an embodiment, the waveguide core 28 may be formed by depositing a layer comprised of its constituent dielectric material on the dielectric layer 40 and patterning the deposited layer with lithography and etching processes. In an embodiment, the waveguide core 27 and the waveguide core 28 may be comprised of different materials. In an embodiment, the waveguide core 27 may be comprised of single-crystal silicon, and the waveguide core 28 may be comprised of silicon nitride.

The waveguide core 28 may have a portion that overlaps with a portion of the underlying waveguide core 27 of the ring resonator 16 over the light coupling region in which the portions of the waveguide cores 27, 28 are adjacent. In an embodiment, the waveguide core 28 partially overlaps by a distance D with the underlying waveguide core 27 of the ring resonator 16 in the light coupling region. In an embodiment, the width of the waveguide core 28 may be reduced in the light coupling region, in comparison with the width outside of the light coupling region, in order to provide a closer refractive index match between the waveguide core 27 and the waveguide core 28 that are comprised of different materials.

With reference to FIG. 6 and in accordance with alternative embodiments of the invention, the ring resonator 16 may be modified to add a slab layer 46 that is appended to a sidewall 47 of the waveguide core 27 in the light coupling region. The slab layer 46, which is thinner than the waveguide core 27, may be comprised of the same material as the waveguide core 27. The waveguide core 28 may overlap by the distance D with a portion of the waveguide core 27 over the light coupling region and may also overlap with the slab layer 46 over the light coupling region. In an embodiment, the waveguide core 28 may fully overlap with the slab layer 46 over the light coupling region. The slab layer 46 may be disposed on the dielectric layer 30, and the slab layer 46 may be connected to a lower region of the waveguide core 27 at the sidewall 47. The waveguide core 27 includes an upper region that projects above the slab layer 46.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical switch, the structure comprising:

a Mach-Zehnder interferometer including a first arm and a second arm, the first arm comprising a first waveguide core, and the second arm comprising a second waveguide core;

a ring resonator comprising a third waveguide core, the third waveguide core having a first thickness, and the third waveguide core including a portion that is adjacent to a portion of the first waveguide core over a light coupling region;

a first slab layer that connects the portion of the first waveguide core to the portion of the third waveguide core, the first slab layer having a second thickness that is less than the first thickness, and the first waveguide core and the third waveguide core including upper regions that project above the first slab layer by a height equal to a difference between the first thickness and the second thickness; and a thermo-optic phase shifter associated with a portion of the second waveguide core of the second arm, wherein the first waveguide core and the second waveguide core of the Mach-Zehnder interferometer, the third waveguide core of the ring resonator, and the first slab layer comprise silicon.

2. The structure of claim 1 wherein the Mach-Zehnder interferometer includes a first directional coupler and a second directional coupler, and the first arm and the second arm are separately routed from the first directional coupler to the second directional coupler.

3. The structure of claim 1 wherein the Mach-Zehnder interferometer includes a first multi-mode interference coupler and a second multi-mode interference coupler, and the first arm and the second arm are separately routed from the first multi-mode interference coupler to the second multi-mode interference coupler.

4. The structure of claim 1 wherein the first waveguide core and the second waveguide core each have a third thickness that is equal to the first thickness.

5. The structure of claim 1 wherein the portion of the first waveguide core is spaced from the portion of the third waveguide core by a gap, and the first slab layer bridges the gap.

6. The structure of claim 5 wherein the third waveguide core is an oblong element with a first curved end, a second curved end, and a side section that connects the first curved end to the second curved end, and the side section is the portion of the third waveguide core that is connected to the first slab layer.

7. The structure of claim 6 wherein the ring resonator has a coupling length over the light coupling region.

8. The structure of claim 6 wherein the gap has a width that is constant over the light coupling region.

9. The structure of claim 6 wherein the first slab layer is coextensive with the side section of the portion of the third waveguide core over an entirety of the gap.

10. The structure of claim 1 further comprising:

a semiconductor substrate; and a dielectric layer on the semiconductor substrate, wherein the first waveguide core and the second waveguide core of the Mach-Zehnder interferometer, the third waveguide core of the ring resonator, and the first slab layer are disposed on the dielectric layer.

11. The structure of claim 1 wherein the third waveguide core is an oblong element with a first curved end, a second curved end, and a side section that connects the first curved end to the second curved end, and the side section is the portion of the third waveguide core that is connected to the portion of the first slab layer.

12. The structure of claim 1 wherein the thermo-optic phase shifter includes a first resistive heating element, a second resistive heating element, and a second slab layer connecting the first resistive heating element and the second resistive heating element to the portion of the second waveguide core of the second arm.

13. The structure of claim 12 wherein the first resistive heating element, the second resistive heating element, and the second slab layer comprise silicon.

14. The structure of claim 13 wherein the first resistive heating element and the second resistive heating element are doped with a p-type dopant or an n-type dopant.

15. The structure of claim 1 wherein the first waveguide core is laterally between the second waveguide core and the ring resonator.

16. The structure of claim 1 further comprising:

a dielectric layer over the Mach-Zehnder interferometer, the thermo-optic phase shifter, and the ring resonator; and a back-end-of-line stack over the dielectric layer.

17. A method of forming a structure for an optical switch, the method comprising:

forming a Mach-Zehnder interferometer that includes a first arm and a second arm, wherein the first arm comprises a first waveguide core, and the second arm comprises a second waveguide core;

forming a ring resonator that comprises a third waveguide core, wherein the third waveguide core has a first thickness, and the third waveguide core includes a portion that is adjacent to a portion of the first waveguide core over a light coupling region;

forming a slab layer that connects the portion of the first waveguide core to the portion of the third waveguide core, wherein the slab layer has a second thickness that is less than the first thickness, and the first waveguide core and the third waveguide core including upper regions that project above the slab layer by a height equal to a difference between the first thickness and the second thickness; and forming a thermo-optic phase shifter associated with a portion of the second waveguide core of the second arm, wherein the first waveguide core and the second waveguide core of the Mach-Zehnder interferometer, the third waveguide core of the ring resonator, and the slab layer comprise silicon.

* * * * *